(12) United States Patent
Dai et al.

(10) Patent No.: US 9,333,547 B2
(45) Date of Patent: May 10, 2016

(54) REFITTING MECHANISM

(71) Applicants: FU DING ELECTRONICAL TECHNOLOGY (JIASHAN) CO., LTD., Zhejiang (CN); HON HAI PRECISION INDUSTRY CO., LTD., New Taipei (TW)

(72) Inventors: Wei-Zhong Dai, Jiashan (CN); Hu Wu, Jiashan (CN); De-Hang Liu, Jiashan (CN)

(73) Assignees: FU DING ELECTRONICAL TECHNOLOGY (JIASHAN) CO., LTD., Zhejiang (CN); HON HAI PRECISION INDUSTRY CO., LTD., New Taipei (TW)

( * ) Notice: Subject to any disclaimer, the term of this patent is extended or adjusted under 35 U.S.C. 154(b) by 137 days.

(21) Appl. No.: 14/156,468

(22) Filed: Jan. 16, 2014

(65) Prior Publication Data

US 2014/0208817 A1    Jul. 31, 2014

(30) Foreign Application Priority Data

Jan. 28, 2013 (CN) .................... 2013 1 00310060

(51) Int. Cl.

| B21D 1/06 | (2006.01) |
|---|---|
| B21D 1/00 | (2006.01) |
| B21D 3/14 | (2006.01) |
| G05B 19/04 | (2006.01) |
| G01B 11/30 | (2006.01) |

(52) U.S. Cl.
CPC .. *B21D 1/06* (2013.01); *B21D 1/00* (2013.01); *B21D 3/14* (2013.01); *G01B 11/306* (2013.01); *G05B 19/04* (2013.01)

(58) Field of Classification Search
CPC ............ B21D 1/06; B21D 3/00; B23P 19/10; G05B 19/04; B23Q 17/20; G01B 11/25; G01B 7/345; G01B 11/306; Y10T 29/53022; Y10T 29/49; Y10T 29/49998; Y10T 29/49895; B21B 37/28; B21B 38/02; B21B 2263/04; H05K 13/0404
USPC .......... 72/31.01, 31.02, 17.3, 19.6, 18.7, 19.7
See application file for complete search history.

(56) References Cited

U.S. PATENT DOCUMENTS

| 2002/0157246 A1* | 10/2002 | Ogimoto ........................ 29/832 |
| 2012/0105867 A1* | 5/2012 | Komatsu ...................... 356/610 |

FOREIGN PATENT DOCUMENTS

| CN | 201136011 Y | 10/2008 |
| CN | 101559449 A | 10/2009 |
| CN | 201572820 U | 9/2010 |
| CN | 201832866 U | * 5/2011 |
| CN | 202479274 U | * 10/2012 |
| JP | 10-5871 A | 1/1998 |

* cited by examiner

*Primary Examiner* — Peter DungBa Vo
*Assistant Examiner* — John S Lowe
(74) *Attorney, Agent, or Firm* — Novak Druce Connolly Bove + Quigg LLP

(57) ABSTRACT

A refitting mechanism for measuring a flatness value of a workpiece and refitting the workpiece includes a worktable, a refitting assembly, a measuring unit, and a controller. The refitting assembly is movably assembled to the worktable. The holding assembly is assembled to the worktable and adjacent to the refitting assembly for holding the workpiece on the worktable. The measuring unit is assembled to the refitting assembly. The controller is electrically connected to the refitting assembly, the holding assembly, and the measuring unit. The measuring unit measures a flatness value of the workpiece and transfers the flatness value to the controller. The controller compares the flatness value with a preset value range to determine whether the workpiece is qualified or not. When the workpiece is not qualified, the controller controls the holding assembly to hold the workpiece, and controls the refitting assembly to refit the workpiece.

18 Claims, 3 Drawing Sheets

REFITTING MECHANISM

BACKGROUND

1. Technical Field

The present disclosure relates to refitting mechanisms, and more particularly to a refitting mechanism capable of assessing and correcting a flatness of a workpiece.

2. Description of Related Art

When measuring a flatness of a workpiece, a micrometer gauge is employed to measure a flatness value of the workpiece. If the flatness value is beyond a preset value range, the workpiece is unqualified and may be refitted by a refitting mechanism. The refitting mechanism refits the workpiece by pressing an unqualified portion of the workpiece, then the flatness of the workpiece is measured again. If the flatness value is still not qualified, the workpiece is refitted again until the workpiece is qualified. Thus, the workpiece may need to be manually transferred to and from the worktable many times, which is time-consuming. In addition, the refitting assembly may press an incorrect portion of the workpiece, thereby reducing a refitting accuracy thereof.

Therefore, there is room for improvement in the art.

BRIEF DESCRIPTION OF THE DRAWINGS

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

Figure 1:
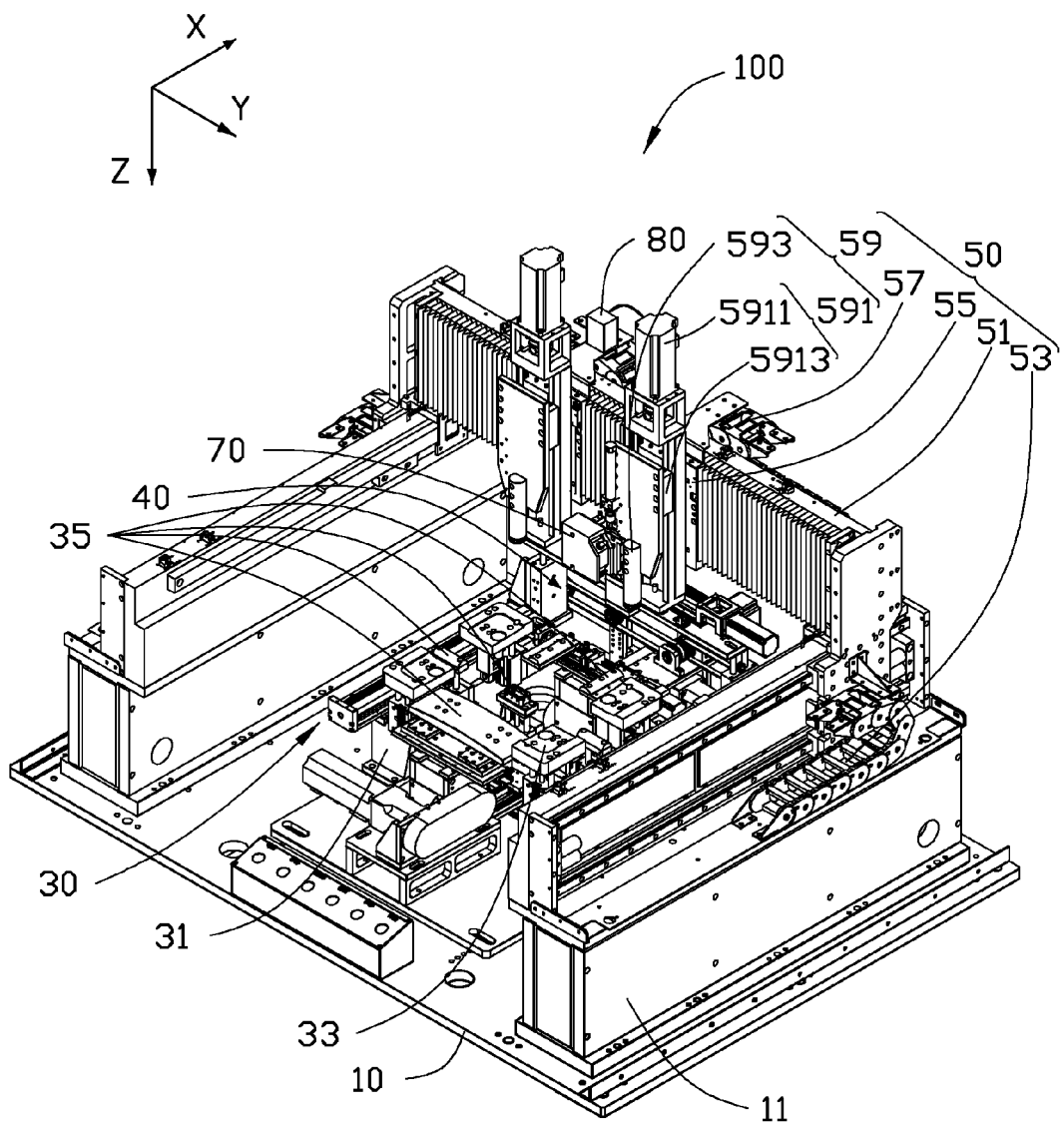
FIG. 1 is an isometric view of an embodiment of a refitting mechanism including a positioning assembly, a holding assembly, a measuring unit, and a refitting assembly.

FIG. 1 shows an embodiment of a refitting mechanism 100 employed to measure a flatness of a workpiece (not shown) and to refit an unqualified workpiece. In one embodiment, the workpiece is substantially rectangular and made of metal. Unqualified workpieces may have twisted or deformed portions.

The refitting mechanism 100 includes a worktable 10, a positioning assembly 30, a holding assembly 40, a refitting assembly 50, a measuring unit 70, and a controller 80. The positioning assembly 30 is assembled to the worktable 10 to support the workpiece. The holding assembly 40 is assembled to the worktable 10 adjacent to the positioning assembly 30 for holding the workpiece on the positioning assembly 30. The refitting assembly 50 is movably assembled to the worktable 10 and located above the positioning assembly 30 for refitting deformed portions of the workpiece. The measuring unit 70 is assembled to the refitting assembly 50 for measuring the flatness of the workpiece. The controller 80 is assembled to the refitting assembly 50 and electrically connected to the holding assembly 40, the refitting assembly 50, and the measuring unit 70. The measuring unit 70 obtains the flatness of the workpiece and transfers a flatness value to the controller 80. The controller 80 compares the flatness value with a preset value range to determine whether the workpiece is qualified or not. When the workpiece is not qualified, the controller 80 controls the holding assembly 40 to hold the workpiece, and controls the refitting assembly 50 to refit deformed portions of the workpiece.

In the illustrated embodiment, the worktable 10 is substantially a rectangular plate and includes two guiding portions 11 located at opposite sides thereof. Each guiding portion 11 is arranged along an X-axis direction.

Figure 2:
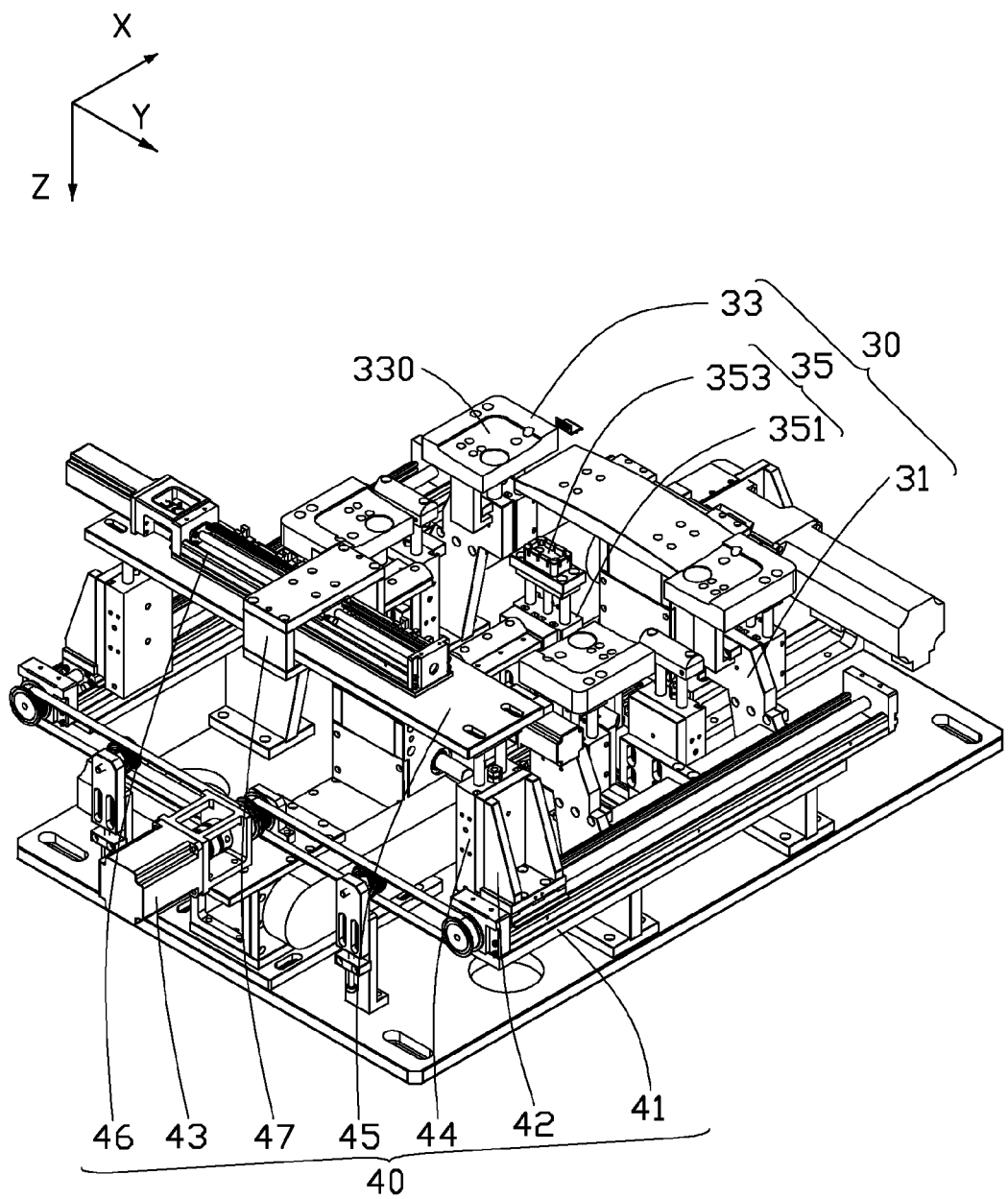
FIG. 2 is an isometric view of the positioning assembly and the holding assembly of the refitting mechanism of FIG. 1, but viewed from another perspective.

FIG. 2 shows the positioning assembly 30 and the holding assembly 40. The positioning assembly 30 is located on the worktable 10 and between the two guiding portions 11. The positioning assembly 30 includes two pairs of supporting brackets 31, four positioning members 33, and a plurality of supporting subassemblies 35. The two pairs of supporting brackets 31 are substantially symmetrically mounted on the worktable 10, such that the two pairs of supporting brackets 31 are opposite to each other and located between the two guiding portions 11. The four positioning members 33 are divided into two groups, and each positioning member 33 is mounted on one corresponding supporting bracket 31. The two groups of positioning members 33 are arranged symmetrically. Each positioning member 33 defines a positioning groove 330 in a top surface thereof to accommodate a corner of the workpiece. The plurality of supporting subassemblies 35 is assembled to the worktable 10 and surrounded by the four positioning members 33, for supporting the workpiece. Each supporting subassembly 35 includes a first driving member 351 and a supporting portion 353 connected to the first driving member 351. The first driving member 351 is configured for driving the supporting portion 353 to support the workpiece.

The holding assembly 40 is assembled to the worktable 10 and adjacent to the positioning assembly 30. The holding assembly 40 includes a pair of guiding rods 41, a pair of sliding blocks 42, a second driving member 43, a pair of third driving members 44, a supporting plate 45, a fourth driving member 46, and a holding member 47. Each guiding rod 41 is connected between two supporting brackets 31, such that the guiding rods 41 are substantially parallel to each other and extend along the X-axis direction. The pair of guiding rods 41 bounds the four positioning members 33. In the embodiment, the guiding rods 41 are lead screw rods. Each sliding block 42 is slidably assembled to a respective guiding rod 41. The second driving member 43 is assembled to the worktable 10 and connected to the pair of guiding rods 41. The guiding rods 41 are rotated by the second driving member 43 to drive the sliding blocks 42 to slide along the guiding rods 41. Each third driving member 44 is assembled to a respective sliding block 42.

The supporting plate 45 is assembled to the pair of third driving members 44 and located above the pair of sliding blocks 42. The supporting plate 45 is arranged along a Y-axis direction. The supporting plate 45 is driven by the pair of third driving members 44 to move up and down along a Z-axis direction. The fourth driving member 46 is assembled to an upper surface of the supporting plate 45. The holding member 47 is slidably sleeved around the fourth driving member 46 and the supporting plate 45, and connected to the fourth driving member 46. The holding member 47 is driven by the fourth driving member 46 to slide along the supporting plate 45. The second driving member 43, the fourth driving member 46, and the pair of third driving members 44 are configured for driving the holding member 47 to move along the X, Y, and Z axes, respectively. Thus, the holding member 47 is aligned with a portion of the workpiece not to be refitted, and pressingly engages and holds the workpiece on the positioning assembly 30.

Figure 3:
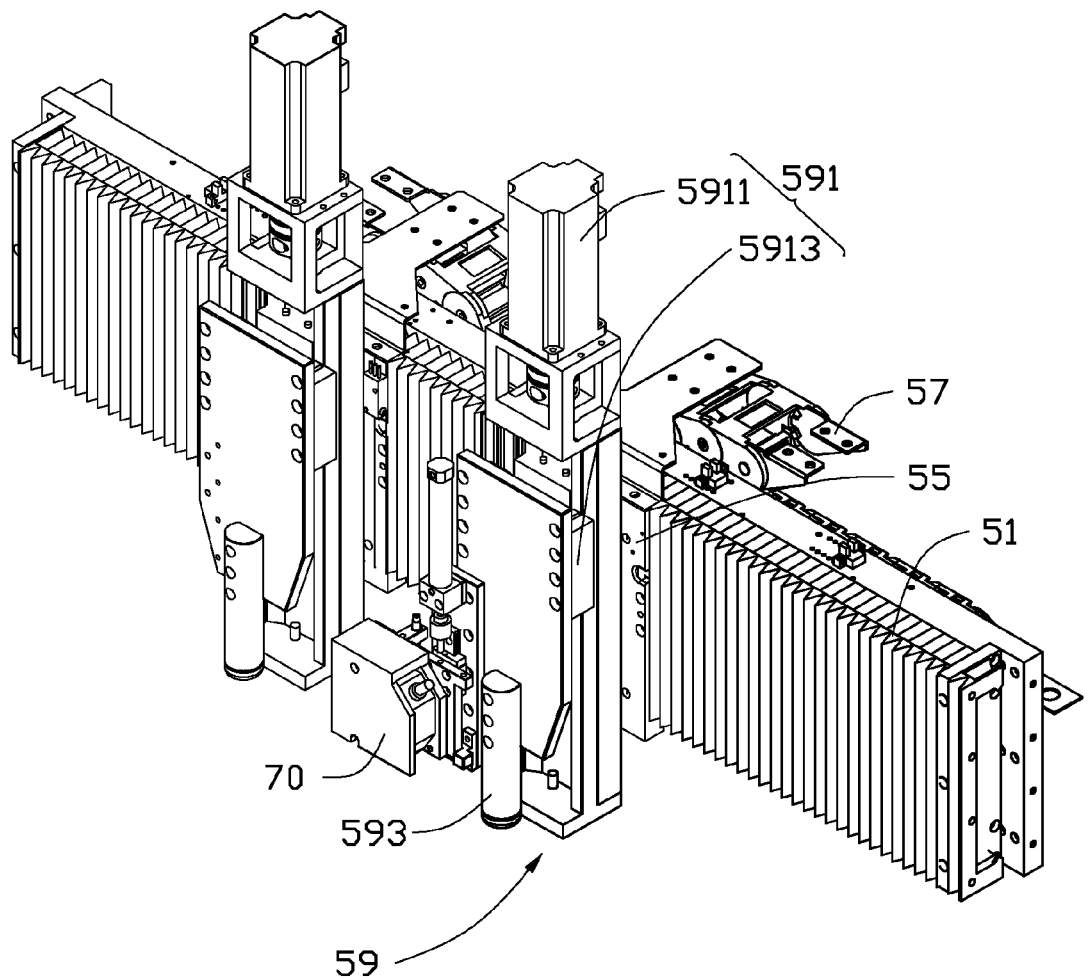
FIG. 3 is an isometric view of the measuring unit and the refitting assembly of the refitting mechanism of FIG. 1.

Referring to FIG. 3 also, the refitting assembly 50 is assembled to the two guiding portions 11 of the worktable 10 and is located above the positioning assembly 30 and the holding assembly 40. The refitting assembly 50 includes a guiding bracket 51, a pair of fifth driving members 53, a pair of sliding members 55, a pair of sixth driving members 57, and a pair of refitting subassemblies 59. Opposite ends of the guiding bracket 51 are slidably assembled to the two guiding portions 11. The guiding bracket 51 is located above the positioning assembly 30 and the holding assembly 40, and is arranged along the Y-axis direction. Each fifth driving member 53 is assembled to a corresponding guiding portion 11 and connected to an end portion of the guiding bracket 51. Each fifth driving member 53 is located adjacent to an end portion of the guiding portion 11. The pair of fifth driving members 53 drives the guiding bracket 51 to slide along the two guiding portions 11. The pair of sliding members 55 is slidably assembled to the guiding bracket 51 and spaced from each other. The pair of sixth driving members 57 is assembled to a surface of the guiding bracket 51 opposite to the pair of sliding members 55, and each sixth driving member 57 is connected to a respective sliding member 55.

Each refitting subassembly 59 is assembled to a respective sliding member 55. Each refitting subassembly 59 includes a driving portion 591 and a refitting member 593. The driving portion 591 includes a driving body 5911 and an output end 5913 connected to the driving body 5911. The driving body 5911 is assembled to a surface of the sliding member 55 opposite to the guiding bracket 51 and arranged along the Z-axis direction. The output end 5913 is connected to an end portion of the driving body 5911 adjacent to the worktable 10. The refitting member 593 is connected to the output end 5913 and located above the positioning assembly 30. The pair of fifth driving members 53 and the pair of sixth driving members 57 are configured for driving the refitting member 593 to move along the X-axis and the Y-axis, respectively, thereby aligning the refitting member 593 to the deformed portions of the workpiece. The driving portion 591 drives the refitting member 593 to slide along the Z-axis direction to refit the workpiece.

The measuring unit 70 is assembled to the output end 5913 of one refitting subassembly 59. The measuring unit 70 is moved along the X, Y, and Z-axis directions along with the output end 5913, to measure the flatness value of the workpiece. The measuring unit 70 transfers the flatness value to the controller 80. In the embodiment, the measuring unit 70 employs a laser to obtain the flatness value of the workpiece.

The controller 80 is assembled to the guiding bracket 51 and electrically connected to the holding assembly 40, the refitting assembly 50, and the measuring unit 70. The controller 80 receives the flatness value from the measuring unit 70, and compares the flatness value to the preset value range to determine whether the workpiece is qualified or not. When the workpiece is not qualified, the controller 80 controls the holding assembly 40 to hold the workpiece on the positioning assembly 30, and controls the refitting assembly 50 to refit the deformed portions of the workpiece.

In assembly, the two pairs of supporting brackets 31 are assembled to the worktable 10. The two groups of positioning members 33 are mounted on the two pairs of supporting brackets 31, respectively. The plurality of supporting subassemblies 35 is disposed on the worktable 10 and bounded by the four positioning members 33. The two guiding rods 41 are assembled to the pair of supporting brackets 31. The two sliding blocks 42 are slidably mounted on the two guiding rods 41, respectively. The second driving member 43 is assembled to the worktable 10 and connected to the two sliding blocks 42. The supporting plate 45 is connected to the two third driving members 44. The fourth driving member 46 is assembled to the end of the supporting plate 45 away from the two sliding blocks 42. The holding member 47 is movably sleeved around the supporting plate 45 and the fourth driving member 46, and connected to the fourth driving member 46. The guiding bracket 51 is slidably mounted on the pair of guiding portions 11. The two fifth driving members 53 are assembled to the pair of guiding portions 11, respectively, and connected to the opposite ends of the guiding bracket 51. The two sliding members 55 are assembled to the guiding bracket 51, and the two sixth driving members 57 are assembled to a surface of the guiding bracket 57 opposite to the two sliding members 55. The two sixth driving members 57 are connected to the two sliding members 55, respectively. The two refitting subassemblies 59 are assembled to the two sliding members 55, respectively, such that the two refitting subassemblies 59 and the guiding bracket 51 are located at opposite sides of the two sliding members 55. The measuring unit 70 is assembled to the refitting member 593 of one refitting subassembly 59. The controller 80 is assembled to the guiding bracket 51 and electrically connected to the holding assembly 40, the refitting assembly 50, and the measuring unit 70.

In use, the workpiece is supported by and partially received in the four positioning grooves 330 of the positioning assembly 30. The measuring unit 70 is moved by the fifth driving members 53 and the sixth driving members 57 along the X-axis and the Y-axis directions to measure the workpiece, thereby obtaining the flatness value of the workpiece. The measuring unit 70 transfers the flatness value to the controller 80. The controller 80 receives the flatness value from the measuring unit 70 and compares the flatness value to the preset value range to determine whether the workpiece is qualified or not. When the workpiece is not qualified, the controller 80 controls the holding assembly 40 to hold the workpiece on the positioning assembly 30. That is, the holding member 47 of the holding assembly 40 is moved by the second driving member 43 and the fourth driving member 46 to move along the X and Y-axis directions to align with the workpiece. The holding member 47 is then driven by the third driving members 44 to move along the Z-axis direction to pressingly engage a portion of the workpiece that is not to be refit, thereby holding the workpiece on the positioning assembly 30. The refitting members 593 are driven by the fifth driving members 53 and the sixth driving members 57 to move along the X and Y-axis directions, thereby aligning the refitting members 593 with the deformed portions of the workpiece. The driving portions 591 drive the refitting members 593 to slide along the Z-axis direction to pressingly engage the deformed portions of the workpiece, thereby refitting the workpiece. The measuring unit 70 measures the flatness of the workpiece again and transfers the flatness value to the controller 80. Then, the controller 80 determines whether the workpiece is qualified or not. If the workpiece is still not qualified, the workpiece is refitted again until the flatness value is within the preset value range, or until an operator stops the process.

The holding assembly 40 is assembled to the worktable 10 and employed to pressingly engage the portions of the workpiece that are not to be refit. The measuring unit 70 is assembled to the refitting assembly 50 for obtaining the flatness value of the workpiece, and transfers the flatness value to the controller 80. The controller 80 controls the refitting assembly 50 to refit the deformed portions of the workpiece. Thus, human labor for measuring the flatness value is spared, operation of the refitting mechanism 100 is simplified, and efficiency of refitting the workpiece is enhanced. Because the holding assembly 40 holds the workpiece in position, the refitting assembly 50 can refit the workpiece more accurately.

In other embodiments, when the workpiece is directly located on the worktable 10 and held by the holding assembly 40, the positioning assembly 30 can be omitted. Numbers of the guiding portions 11, the supporting brackets 31, the guiding rods 41, the sliding blocks 42, the third driving members 44, the fifth driving members 53, the sliding members 55, the sixth driving members 57, and the refitting subassemblies 59 are not limited to two, and can be more than two. A number of the positioning members 33 is not limited to four, and can be two, three, or more than four. When the number of the positioning members 33 is two, the number of the supporting brackets 31 can be one, and the two positioning members 33 are assembled to the supporting bracket 31 and spaced from each other. The number of the refitting subassemblies 35 can be one or more than two. The two guiding rods 41 can be directly assembled to the worktable 10 and located at opposite sides of the positioning assembly 30, respectively.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A refitting mechanism for measuring a flatness value of a workpiece and refitting the workpiece, comprising:
    a worktable;
    a refitting assembly movably assembled to the worktable;
    a holding assembly assembled to the worktable for holding the workpiece on the worktable, the holding assembly being adjacent to the refitting assembly;
    a measuring unit assembled to the refitting assembly; and
    a controller electrically connected to the refitting assembly, the holding assembly and the measuring unit;
    wherein the measuring unit measures a flatness of the workpiece and transfers a flatness value to the controller, the controller compares the flatness value with a preset value range to determine whether the workpiece is qualified or not, when the workpiece is not qualified, the controller controls the holding assembly to hold the workpiece, and controls the refitting assembly to refit the workpiece; and
    wherein the worktable is equipped with at least one guiding portion, the refitting assembly comprises a guiding bracket and at least one refitting subassembly slidably assembled to the guiding bracket, the guiding bracket is slidably mounted on the at least one guiding portion, the refitting subassembly is capable of sliding relative to the guiding bracket and the worktable, and the measuring unit is assembled to the at least one refitting subassembly.

2. The refitting mechanism of claim 1, further comprising a positioning assembly assembled to the worktable, wherein the positioning assembly is positioned adjacent to the holding assembly and located below the refitting assembly and the measuring unit, the positioning assembly is configured for supporting the workpiece, and the holding assembly holds the workpiece on the positioning assembly.

3. The refitting mechanism of claim 2, wherein the positioning assembly comprises at least one supporting bracket and at least two positioning members, the at least one supporting bracket is assembled to the worktable adjacent to the holding assembly, the at least two positioning members are mounted on the at least one supporting bracket and located below the measuring unit and the refitting assembly, and each positioning member defines a positioning groove, for receiving a corner of the workpiece.

4. The refitting mechanism of claim 3, wherein the positioning assembly further comprises at least one supporting subassembly assembled to the worktable, the at least one supporting subassembly comprises a first driving member and a supporting portion connected to the first driving member, and the first driving member is configured for driving the supporting portion to support the workpiece.

5. The refitting mechanism of claim 1, wherein the holding assembly comprises at least one guiding rod, at least one sliding block, a second driving member, at least one third driving member, a supporting plate, a fourth driving member and a holding member, the at least one guiding rod and the second driving member are assembled to the worktable, the second driving member is connected to the at least one guiding rod, the at least one sliding block is slidably assembled to the at least one guiding rod, the at least one guiding rod is rotated by the second driving member to drive the at least one sliding block to slide along the at least one guiding rod, the at least one third driving member is assembled to the at least one sliding block, the supporting plate is assembled to the at least one third driving member and driven by the at least one third driving member up and down, the fourth driving member is assembled to the supporting plate, the holding member is slidably sleeved on the fourth driving member and the supporting plate, and connected to the fourth driving member, and the holding member is driven by the fourth driving member to slide along the supporting plate.

6. The refitting mechanism of claim 1, wherein the refitting assembly comprises at least one fifth driving member, at least one sliding member, and at least one sixth driving member, the guiding bracket is located above the holding assembly, the at least one fifth driving member is assembled to the at least one guiding portion and connected to the guiding bracket for driving the guiding bracket to slide along the at least one guiding portion, the at least one sliding member is slidably assembled to the guiding bracket, the at least one sixth driving member is assembled to the guiding bracket and connected to the at least one sliding member for moving the at least one sliding member along the guiding bracket, the at least one refitting subassembly is assembled to the at least one sliding member for refitting the workpiece.

7. The refitting mechanism of claim 6, wherein the at least one refitting subassembly comprises a driving portion and a refitting member connected to the driving portion, the driving portion is assembled to the at least one sliding member, the measuring unit is assembled to the refitting member, and the driving portion drives the refitting member up and down.

8. The refitting mechanism of claim 7, wherein the driving portion comprises a driving body and an output end connected to the driving body, the driving body is assembled to the at least one sliding member, the output end is connected to an end of the driving body adjacent to the worktable, the refitting member and the measuring unit are connected to the output end, the workpiece comprises deformed portions and non-refitting portions, the holding member resists the non-refitting portion and holds the workpiece on the positioning assembly, and the driving portion drives the refitting member to refit the deformed portions of the workpiece.

9. The refitting mechanism of claim 1, wherein the measuring unit employs a laser to measure the flatness of the workpiece.

10. A refitting mechanism for measuring a flatness value of a workpiece and refitting the workpiece, comprising:
a worktable;
a refitting assembly movably assembled to the worktable;
a holding assembly assembled to the worktable for holding the workpiece;
a measuring unit assembled to the refitting assembly;
a controller assembled to the refitting assembly adjacent to the measuring unit, the controller being electrically connected to the refitting assembly, the holding assembly and the measuring unit;
wherein the measuring unit measures a flatness of the workpiece and transfers a flatness value to the controller, the controller compares the flatness value with a preset value range to determine whether the workpiece is qualified or not, when the workpiece is not qualified, the workpiece comprises deformed portions and non-refitting portions, the controller controls the holding assembly to resist the non-refitting portion toward the positioning member, thereby holding the workpiece, and controls the refitting assembly to refit the deformed portions of the workpiece; and
wherein the worktable is equipped with at least one guiding portion, the refitting assembly comprises a guiding bracket and at least one refitting subassembly slidably assembled to the guiding bracket, the guiding bracket is slidably mounted on the at least one guiding portion, the refitting subassembly is capable of sliding relative to the guiding bracket and the worktable, and the measuring unit is assembled to the at least one refitting subassembly.

11. The refitting mechanism of claim 10, further comprising a positioning assembly assembled to the worktable, wherein the positioning assembly is positioned adjacent to the holding assembly and located below the refitting assembly and the measuring unit, the positioning assembly is configured for supporting the workpiece, and the holding assembly holds the workpiece on the positioning assembly.

12. The refitting mechanism of claim 11, wherein the positioning assembly comprises at least one supporting bracket and at least two positioning members, the at least one supporting bracket is assembled to the worktable adjacent to the holding assembly, the at least two positioning members are mounted on the at least one supporting bracket and located below the measuring unit and the refitting assembly, and each positioning member defines a positioning groove, for receiving a corner of the workpiece.

13. The refitting mechanism of claim 12, wherein the positioning assembly further comprises at least one supporting subassembly assembled to the worktable, the at least one supporting subassembly comprises a first driving member and a supporting portion connected to the first driving member, and the first driving member is configured for driving the supporting portion to support the workpiece.

14. The refitting mechanism of claim 10, wherein the holding assembly comprises at least one guiding rod, at least one sliding block, a second driving member, at least one third driving member, a supporting plate, a fourth driving member, and a holding member, the at least one guiding rod and the second driving member are assembled to the worktable, the second driving member is connected to the at least one guiding rod, the at least one sliding block is slidably assembled to the at least one guiding rod, the at least one guiding rod is rotated by the second driving member to drive the at least one sliding block to slide along the at least one guiding rod, the at least one third driving member is assembled to the at least one sliding block, the supporting plate is assembled to the at least one third driving member and driven by the at least one third driving member up and down, the fourth driving member is assembled to the supporting plate, the holding member is slidably sleeved on the fourth driving member and the supporting plate, and connected to the fourth driving member, and the holding member is driven by the fourth driving member to slide along the supporting plate.

15. The refitting mechanism of claim 10, wherein the refitting assembly comprises at least one fifth driving member, at least one sliding member, and at least one sixth driving member, the guiding bracket is located above the holding assembly, the at least one fifth driving member is assembled to the at least one guiding portion and connected to the guiding bracket for driving the guiding bracket to slide along the at least one guiding portion, the at least one sliding member is slidably assembled to the guiding bracket, the at least one sixth driving member is assembled to the guiding bracket and connected to the at least one sliding member for moving the at least one sliding member along the guiding bracket, the at least one refitting subassembly is assembled to the at least one sliding member for refitting the workpiece.

16. The refitting mechanism of claim 15, wherein the at least one refitting subassembly comprises a driving portion and a refitting member connected to the driving portion, the driving portion is assembled to the at least one sliding member, the measuring unit is assembled to the refitting member, and the driving portion drives the refitting member up and down.

17. The refitting mechanism of claim 16, wherein the driving portion comprises a driving body and an output end connected to the driving body, the driving body is assembled to the at least one sliding member, the output end is connected to an end of the driving body adjacent to the worktable, the refitting member and the measuring unit are connected to the output end, and the driving portion drives the refitting member to refit the deformed portions of the workpiece.

18. The refitting mechanism of claim 10, wherein the measuring unit employs a laser to measure the flatness of the workpiece.

* * * * *